United States Patent [19]

Fauck

[11] 4,361,362
[45] Nov. 30, 1982

[54] ADAPTER FOR TESTING FOR LEAKAGE IN BRAKE FORCE REGULATING DEVICES IN FLUID PRESSURE OPERABLE BRAKE SYSTEMS

[75] Inventor: Gerhard Fauck, Hanover, Fed. Rep. of Germany

[73] Assignee: Wabco Fahrzeugbremsen GmbH, Hanover, Fed. Rep. of Germany

[21] Appl. No.: 223,871

[22] Filed: Jan. 9, 1981

[30] Foreign Application Priority Data

Jan. 18, 1980 [DE] Fed. Rep. of Germany ....... 3001679

[51] Int. Cl.$^3$ .............................................. B60T 8/22
[52] U.S. Cl. .................................. 303/22 A; 73/39; 73/40; 303/23 A; 303/1
[58] Field of Search ............... 303/23 R, 23 A, 22 R, 303/22 A, 1, 2; 188/195, 152, 151 A; 73/39, 40, 40.5, 40.7, 46, 47, 49.5, 49.8, 121

[56] References Cited

U.S. PATENT DOCUMENTS

| | | | |
|---|---|---|---|
| 2,993,199 | 7/1961 | Browne et al. | 73/39 UX |
| 3,304,420 | 2/1967 | Bowman | 73/39 X |
| 3,531,981 | 10/1970 | Pommer | 303/1 X |
| 3,901,562 | 8/1975 | Powell et al. | 303/1 X |
| 3,945,684 | 3/1976 | Chellis | 303/1 |
| 4,076,322 | 2/1978 | Banker et al. | 73/39 X |

*Primary Examiner*—Douglas C. Butler
*Attorney, Agent, or Firm*—R. S. Visk

[57] ABSTRACT

An adapter for use in a fluid pressure operable brake system, including a vehicle load responsive brake force regulator, for testing the brake force regulator for pressure leakage. The adapter is so designed as to require a single connection to be made to a source of test pressure rather than the two connections presently if the test pressure source is connected directly to the brake force regulator.

4 Claims, 1 Drawing Figure

U.S. Patent
Nov. 30, 1982
4,361,362
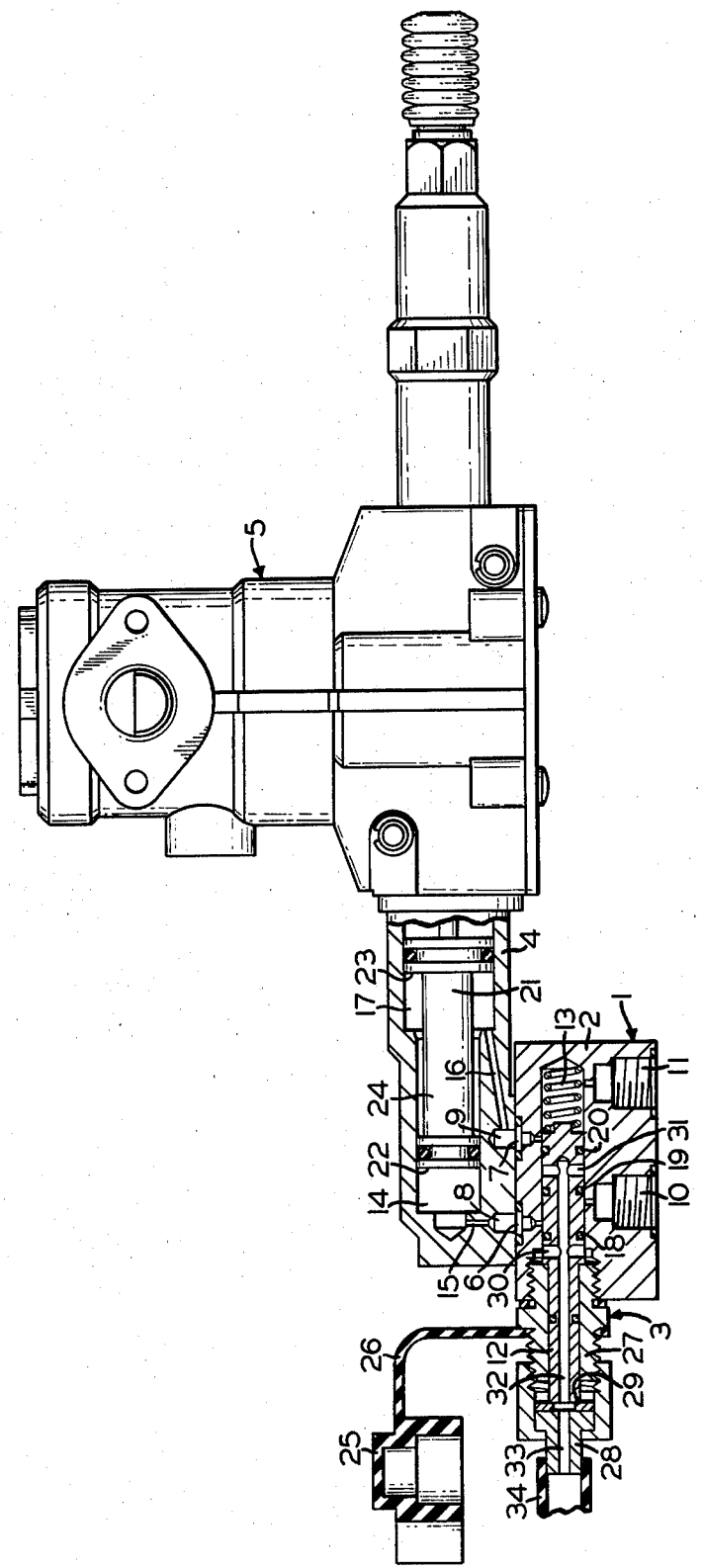

ADAPTER FOR TESTING FOR LEAKAGE IN BRAKE FORCE REGULATING DEVICES IN FLUID PRESSURE OPERABLE BRAKE SYSTEMS

BACKGROUND OF THE INVENTION

Brake force regulators, as well as all other valve devices forming part of a fluid pressure operable brake system, are subject to leakage tests as part of periodic brake inspections as may be prescribed by law. Vehicle preload responsive brake force regulators of the conventional type having "empty", "half", and "load" positions must also be checked for leakage. In this type of brake force regulator, the several positions can be set by hand if the brake force regulator is operably controlled by deflection of conventional leaf or coil springs.

A presently known method of brake-force regulating of vehicles having pneumatic or mechanical springs, with hydraulic axle balancing, utilizes a control pressure, the degree of which is determined by the springs on both sides of the vehicle, acting on opposing pressure areas of equal size on an operating piston of the brake force regulator via respective connections. Since there are two control pressure connections in this type of brake force regulator, two connections to the test pressure must be made when conducting a leakage test. This necessitates the removal of two protective caps so that two test pressure hoses may be connected to the regulator. In using such apparatus, it is possible that one of the hoses may be inadvertently left connected, thereby resulting in false test results.

SUMMARY OF THE INVENTION

The object of the present invention is to provide an adapter for testing brake force regulators and other devices having a pair of control pressure inlets for leakage, said adapter being so designed as to require just a single connection to the test pressure conduit rather than two connections without having to disconnect the connections to air spring and hydraulic axle balancing devices.

The single FIGURE drawing shows a brake force regulator, in outline, with a testing adapter, shown in section, secured thereto and embodying the invention.

DESCRIPTION AND OPERATION

As shown in the drawing, a test adapter 1 which comprises a housing 2 and a connecting portion 3, is secured to a housing 4 of a brake force regulator 5 in such disposition that outlet openings 6 and 7 formed in housing 2 register with inlet openings 8 and 9, which serve normally as connections to control pressure from vehicle air springs (not shown). However, instead of openings 6 and 7 being directly connected to air spring pressure, corresponding inlet openings 10 and 11, formed in housing 2 opposite openings 6 and 7 serve as connections for air spring control pressure.

During normal driving operation, a coaxially disposed hollow stem 12 of connecting portion 3 is biased by a spring 13 to a first communicating position in which it is shown in the drawing and in which communication is established between inlet 10 and inlet 8, and between inlet 11 and inlet 9, respectively. Thus, control pressure may flow from the air springs (not shown) and axle balancing device (not shown) on one side of the vehicle, via inlet 10, to which the air spring and the axle balancing device on said one side of the vehicle are connected, to a first control chamber 14 in the brake force control regulator 5 via said inlet 10, past stem 12, via outlet 6, and a passageway 15. In a similar manner, control pressure may flow from air springs (not shown) and an axle balancing device (not shown) on the other side of the vehicle via inlet 11, past stem 12, via outlet 7, and a passageway 16, to a second control chamber 17 in brake force regulator 5. Sufficient radial space is provided between stem 12 and housing 2 to permit passage of fluid therebetween and between axially spaced sealing rings 18, 19, and 20 forming sealing barriers to prevent leakage from the areas of stem 12 past which the above-mentioned control pressure flows en route to control chambers 14 and 17.

The brake force regulator 5 includes an operating piston 21 having equal pressure areas 22 and 23 disposed at respective ends of a piston stem 24 and adjacent control chambers 14 and 17, respectively. Thus, control piston 21 is acted upon by a control force representing an average value of the established pressures in the respective chambers 14 and 17 acting on pressure areas 22 and 23, respectively, to set the brake force regulator 5, in a manner not deemed essential to an understanding of the invention, to produce a braking force commensurate with said control force.

When testing for leakage, with the adapter 1 secured in the position shown, a protective cap 25, secured by a flexible tether 26 to the body of connecting portion 3 to prevent loss thereof, is slipped off an exterior screw threaded end 27 of said connecting portion. A connection fitting 28 is screwed onto end 27, and in so doing, the adjacent end of stem 12 is abuttingly engaged by an internal shoulder 29 formed in said connection fitting. As connection adapter 28 is further screwed onto end 27 of adapter 3, stem 12 is moved axially to the right, as viewed in the drawing, against the biasing effort of spring 13 to a second communicating position so as to first disrupt communication of inlets 10 and 11 with inlets 8 and 9, and further until transversely disposed passageways 30 and 31 intersecting a coaxial passageway 32 formed in stem 12, register with outlets 6 and 7, respectively, to thereby communicate said passageway therewith.

The inner end of passageway 32 is closed off while the opposite end is open and is in alignment and communication with a passageway 33 formed in connection adapter 28. A high pressure hose 34 is secured on connection adapter 28 for supplying test pressure to test adapter 1 when testing for leakage. Although not shown, a pressure gauge could be tapped into hose 34 to detect any unusual drop in test pressure supplied to brake force regulator 5, thereby indicating leakage and the rate thereof.

It should be noted at this point that, according to the invention, only one connection need be made via connecting portion 3 of adapter 1, otherwise test pressure would have to be connected to both inlets 10 and 11, after having disconnected them from the air springs and axle balancing devices, to conduct tests for leakage. As was noted hereinbefore, such procedure could result in inaccurate results.

Having now described the invention what I claim as new and desire to secure by Letters Patent, is:

1. An adapter for use in a fluid pressure operable brake system, including a vehicle load-responsive brake force regulator, for checking said brake force regulator for fluid pressure leakage, said brake force regulator having a pair of fluid pressure connections to air springs on opposite sides of the vehicle and operable responsively to the vehicle load condition for determining the degree of brake force, said adapter comprising:

(a) a housing securable to said brake force regulator;

(b) an axially movable hollow stem longitudinally disposed in said housing and having a coaxially disposed longitudinal passageway, closed at one end, formed therein;

(c) a spring disposed in said housing for biasing said hollow stem toward a first communicating position in which said fluid pressure connections are communicated with a pair of fluid pressure inlets formed in the brake force regulator;

(d) an operating piston operably disposed in the brake force regulator and operable responsively to fluid pressure communicated thereto from said fluid pressure connections, via said fluid pressure inlets, for setting said brake force regulator accordingly; and (e) a screw-threaded connection fitting screwable onto an exterior end of said adapter and making abutting contact with the end of said hollow stem opposite said closed end, (f) said hollow stem being axially movable, upon screwing of said connection fitting onto said adapter, out of its said first communicating position to a second communicating position in which communication between said fluid pressure connections and said fluid pressure inlets is interrupted, and said fluid pressure inlets are communicated, via a pair of transverse passageways in said stem, with said longitudinal passageway, (g) said longitudinal passageway being connectable to an independent source of test pressure for charging said brake force regulator and adapter to determine the presence of leakage.

2. An adapter for use with a brake force regulator, as set forth in claim 1, wherein said hollow stem when in its said communicating position, provides a connection of said fluid pressure inlets, via said longitudinal and transverse passageways.

3. An adapter for use with a brake force regulator, as set forth in claim 1, wherein said transverse passageways are so axially spaced as to register with said fluid pressure inlets in said second communicating position of said hollow stem.

4. An adapter for use with a brake force regulator, as set forth in claim 1, wherein said connection fitting is removable from said exterior end of the adapter in which an internal shoulder is formed for limiting axial movement of said hollow stem by said spring to its said first communicating position upon removal of said connecting fitting.

* * * * *